United States Patent [19]
Tabota

[11] Patent Number: 5,942,685
[45] Date of Patent: Aug. 24, 1999

[54] ACCELERATION SENSOR

[75] Inventor: Jun Tabota, Toyama-ken, Japan

[73] Assignee: Murata Manufacturing Co., Ltd., Japan

[21] Appl. No.: 08/922,220

[22] Filed: Sep. 2, 1997

[30] Foreign Application Priority Data

Sep. 2, 1996 [JP] Japan ................................. 8-232134

[51] Int. Cl.⁶ .................................................. G01P 15/09
[52] U.S. Cl. .......................................... 73/493; 73/514.34
[58] Field of Search ............................... 73/493, 514.01, 73/514.16, 514.32, 514.33, 514.34; 310/329

[56] References Cited

U.S. PATENT DOCUMENTS

| | | | |
|---|---|---|---|
| 5,503,016 | 4/1996 | Koen | 73/493 |
| 5,515,725 | 5/1996 | Tabota et al. | 73/514.34 |
| 5,734,107 | 3/1998 | Boehm et al. | 73/514.34 |
| 5,745,347 | 4/1998 | Miller et al. | 73/493 |
| 5,783,748 | 7/1998 | Otani | 73/493 |
| 5,817,941 | 10/1998 | Stalnaker et al. | 73/493 |

*Primary Examiner*—John E. Chapman
*Attorney, Agent, or Firm*—Ostrolenk, Faber, Gerb & Soffen, LLP

[57] ABSTRACT

An acceleration sensor is able to reduce the mount space thereof and to prevent detection precision from being lowered by yawing when external force is applied. The acceleration sensor reduces the mount space by attaching a circuit substrate so as to extend perpendicularly to a mounting substrate, and prevents detection precision from being lowered by yawing of the circuit substrate by setting the acceleration detecting direction of an acceleration detecting device mounted on the circuit substrate parallel to the main surfaces of both the mounting substrate and the circuit substrate.

6 Claims, 5 Drawing Sheets

ACCELERATION SENSOR

BACKGROUND OF THE INVENTION

1. Field of the Invention

The present invention relates to an acceleration sensor for use in detecting acceleration in, for example, an air bag for a vehicle, and more particularly, to an acceleration sensor having an improved mounting structure for an acceleration detecting device.

2. Description of the Related Art

In a conventional vehicular air bag, an acceleration sensor is used to put the air bag into action in case of a collision. In other words, the acceleration acting at the collision is detected by the acceleration sensor, and the air bag is operated in response to output signals from the acceleration sensor.

Widely used as the acceleration sensor is a piezoelectric sensor which is excellent in mechanical shock resistance and capable of easily outputting the acceleration as electric signals. FIG. 6 is a plan view of an example of the conventional acceleration sensor, and FIG. 7 is a sectional view taken along the line B—B in FIG. 6.

An acceleration sensor 1 is formed of a case which consists of a case substrate 2 and a cover 3 having an opening at the bottom thereof, that is, the cover 3 is put on the case substrate 2 and fixed. An acceleration detecting device 4 is placed in a space enclosed by the cover 3. The acceleration detecting device 4 comprises a support member 4a fixed on the upper surface of the case substrate 2, and a piezoelectric acceleration detecting portion 4b attached to the support member 4a at one end in a cantilevered manner.

On the side of the acceleration detecting device 4, a signal circuit is located on a circuit substrate 5 to electrically process output signals taken from the acceleration detecting device 4.

The acceleration sensor 1 is also provided with lead terminals 6a to 6e drawn downward from the case substrate 2, and mounted for use by inserting the lead terminals 6a to 6e into a mounting substrate in a circuit portion of the air bag.

In the acceleration sensor 1 shown in FIGS. 6 and 7, however, the circuit substrate 5 is placed on the side of the acceleration detecting device 4, and the acceleration detecting device 4 and the circuit substrate 5 are dispersed on the case substrate 2 in the horizontal direction. Consequently, a large amount of space is required to mount the acceleration sensor 1 on the mounting substrate.

There also have been strong demands in applied products of the acceleration sensor, such as a vehicular air bag, for reducing the mounting space of the acceleration sensor.

SUMMARY OF THE INVENTION

Accordingly, it is an object of the present invention to provide an acceleration sensor capable of decreasing the mounting space thereof and of detecting acceleration with high precision.

After making examinations to reduce the space in which an acceleration sensor is mounted, the present inventor came to the conclusion that the space can be reduced by attaching a circuit substrate with an acceleration detecting device mounted thereon to a mounting substrate perpendicularly as shown in FIG. 8. In an acceleration sensor 11 shown in FIG. 8, a circuit substrate 13 is placed on a mounting substrate 12 so as to extend in the vertical direction. An acceleration detecting device 14 is mounted on the circuit substrate 13, and condensers 15a and 15b, a transistor 15c, a resistor 15d and the like are also mounted thereon to constitute a signal processing circuit for processing signals obtained from the acceleration detecting device 14. Appropriate electronic parts are mounted on the other unillustrated main surface of the circuit substrate 13, and various kinds of electronic parts formed on both of the main surfaces are electrically connected by a conductive pattern 16, thereby constituting the signal processing circuit.

Lead terminals 17a to 17f are inserted into through holes formed through the mounting substrate 12 and fixed by solder 18.

In the acceleration sensor 11, the circuit substrate 13 with the acceleration detecting device 14 mounted thereon is attached to the mounting substrate 12 so as to extend in the vertical direction, which reduces the mounting space for the acceleration sensor 11.

The acceleration detecting direction of the acceleration detecting device 14 is orthogonal to the main surface of the circuit substrate 13, that is, orthogonal to the plane of FIG. 8.

On the other hand, the circuit substrate 13 is shaped like an almost flat plate, and fixed on the mounting substrate 12 by the lead terminals 17a to 17f. If the acceleration acts in the direction of thickness of the circuit substrate 13, the upper part of the circuit substrate 13 rocks in the thickness direction thereof (referred to as "yawing" hereinafter) about the contact portions between the lead terminals 17a to 17d and the mounting substrate 12, which makes it difficult to detect the acting acceleration precisely.

As a result of various examinations of the above problem, the present inventor has found that the mounting space for an acceleration sensor can be reduced by mounting a circuit substrate so that the surface thereof is perpendicular to a mounting substrate and that acting acceleration is detected precisely by setting the acceleration detecting direction of an acceleration detecting device parallel to both the circuit substrate surface and the mounting substrate surface, and has devised the present invention.

According to an aspect of the present invention, an acceleration sensor comprises an acceleration detecting device, a circuit substrate having the acceleration detecting device mounted thereon and a signal processing circuit electrically connected to the acceleration detecting device to subject output of the acceleration detecting device to signal processing, and a mounting substrate having the circuit substrate mounted thereon, wherein the circuit substrate is mounted so that the surface thereof is perpendicular to the surface of the mounting substrate and the acceleration detecting direction of the acceleration detecting device is parallel to both the circuit substrate surface and the mounting substrate surface.

In the acceleration sensor of the present invention, since the acceleration detecting direction of the acceleration detecting device is thus parallel to both the circuit substrate surface and the mounting substrate surface, measurement precision is prevented from being lowered by the foregoing yawing of the circuit substrate owing to acting acceleration as is made clear from the following description of the preferred embodiment of the invention.

DESCRIPTION OF THE PREFERRED EMBODIMENT

Figure 1:
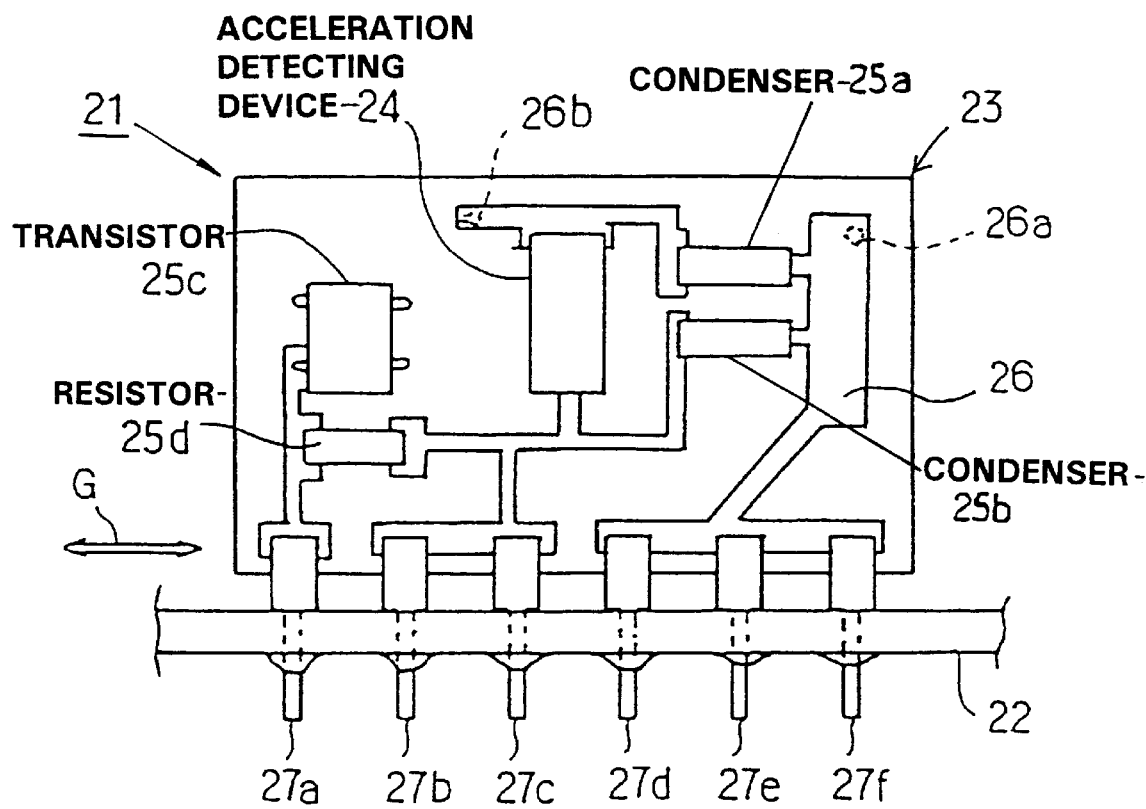
FIG. 1 is a front view of an acceleration sensor according to an embodiment of the present invention.
Figure 2:
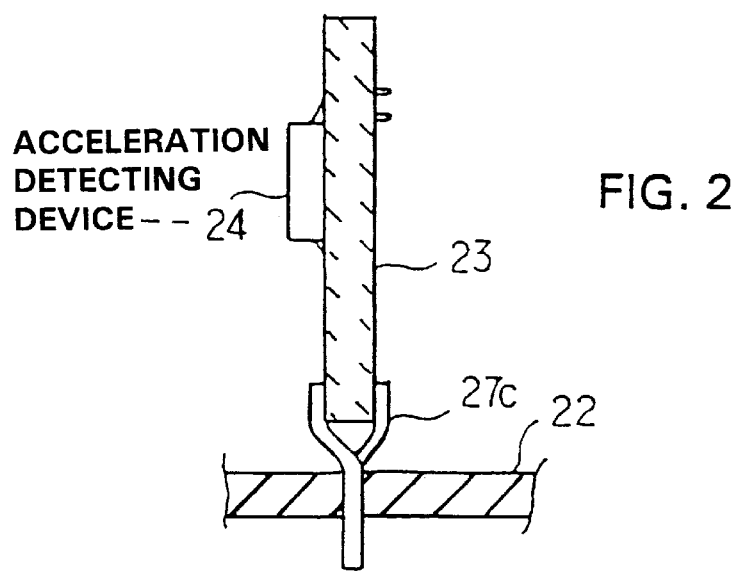
FIG. 2 is a sectional side view of the acceleration sensor shown in FIG. 1.

FIGS. 1 and 2 are front and sectional side views of an acceleration sensor according to an embodiment of the present invention.

In an acceleration sensor 21, a circuit substrate 23 is mounted on a mounting substrate 22, which is made of an insulating material such as synthetic resin or insulating ceramics like alumina, so that the surface thereof is perpendicular to the upper surface of the mounting substrate 22.

The circuit substrate 23 is also made of an appropriate insulating material such as insulating ceramics like alumina, or synthetic resin, and an acceleration detecting device 24 is mounted on one main surface thereof.

Furthermore, condensers 25a and 25b, a transistor 25c, a resistor 25d and the like are mounted on the circuit substrate 23. These various electronic parts are electrically connected to one another through a conductive pattern 26 formed on the circuit substrate 23 to constitute a signal processing circuit for processing output signals of the acceleration detecting device 24. Through hole electrodes 26a and 26b are electrically connected to a conductive pattern, which is not shown, on the other surface of the circuit substrate 23.

Figure 4:
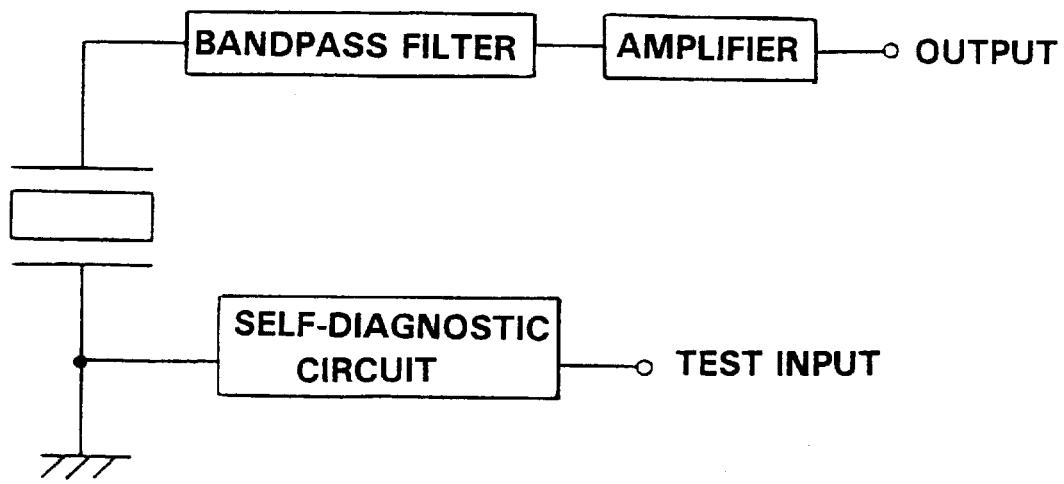
FIG. 4 is a block diagram of a signal processing circuit in the acceleration sensor of the embodiment.

FIG. 4 is a block diagram of the signal processing circuit constituted by the condensers 25a and 25b, the transistor 25c, the resistor 25d and the like. It should be noticed that the circuit shown in FIG. 4 is of the well-known type and that the circuit for processing output signals of the acceleration detecting device 24 in the acceleration sensor of the present invention is not limited to this circuit.

The circuit substrate 23 is fixed on the mounting substrate 22 by lead terminals 27a to 27f. In other words, the lead terminals 27a to 27f are each bifurcated at the top end thereof so as to nip the circuit substrate 23, and the bifurcated portions thereof are respectively joined to appropriate positions on the conductive pattern 26 by solder (not shown) or the like.

This embodiment is characterized in that the acceleration detecting direction G of the acceleration detecting device 24 is parallel to both the main surface of the mounting substrate 22 and the main surface of the circuit substrate 23, thereby enhancing acceleration detecting precision. This characteristic will be described below with reference to FIG. 3.

Figure 3A:
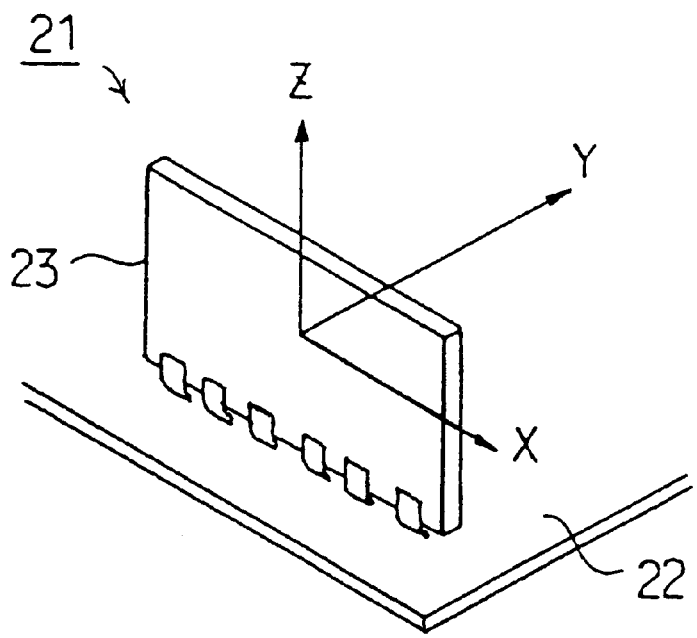
FIGS. 3A and 3B are a schematic perspective view and a side view, respectively, for explaining the reason why detection precision is difficult to be lowered even if yawing arises in the acceleration sensor of the embodiment.

The coordinates in the acceleration sensor 21 are defined as shown in FIG. 3A, that is, the direction parallel to the main surface of the circuit substrate 23 and the mounting substrate 22 is represented by the X axis, the direction orthogonal to the circuit substrate 23 is represented by the Y axis, and the direction orthogonal to the mounting substrate 22 is represented by the Z axis. Therefore, the detecting direction G of the acceleration detecting device 24 is the X-axis direction.

Since the circuit substrate 23 is mounted on the mounting substrate 22 above in the acceleration sensor 21 as mentioned above, if external force is applied, the circuit substrate 23 is prone to yaw in the Y direction, while it is not prone to yaw in the X direction.

Figure 3B:
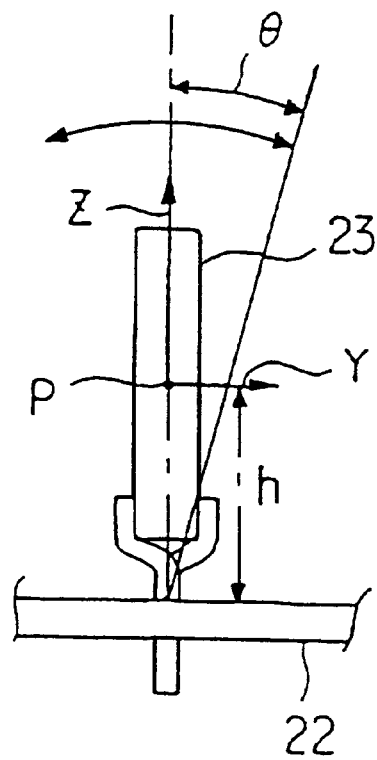

When the circuit substrate 23 yaws in the Y-axis direction, components Dx, Dy and Dz are generated at the center P thereof by the yawing as shown in FIG. 3B. If the center angle between the initial position of the circuit substrate 23 and the position where the circuit substrate 23 yaws to the maximum degree (the center angle with the center O) is taken as θ, and the height from the substrate 22 to the center P is taken as h, as shown in FIG. 3B, the above-mentioned Dx, Dy and Dz are represented as follows:

Dx=0

Dy=h×sin θ

Dz=h×(1−cos θ)

Accordingly, in the acceleration sensor 21 of the embodiment for performing detection in the X-axis direction, only the Y-axis and Z-axis components Dy and Dz exist, and the component Dx in the X-axis direction does not arise even if yawing occurs. Since no noise component in the X-axis direction exists, the acceleration acting in the X-axis direction can be detected with high precision even at yawing.

Figure 8:
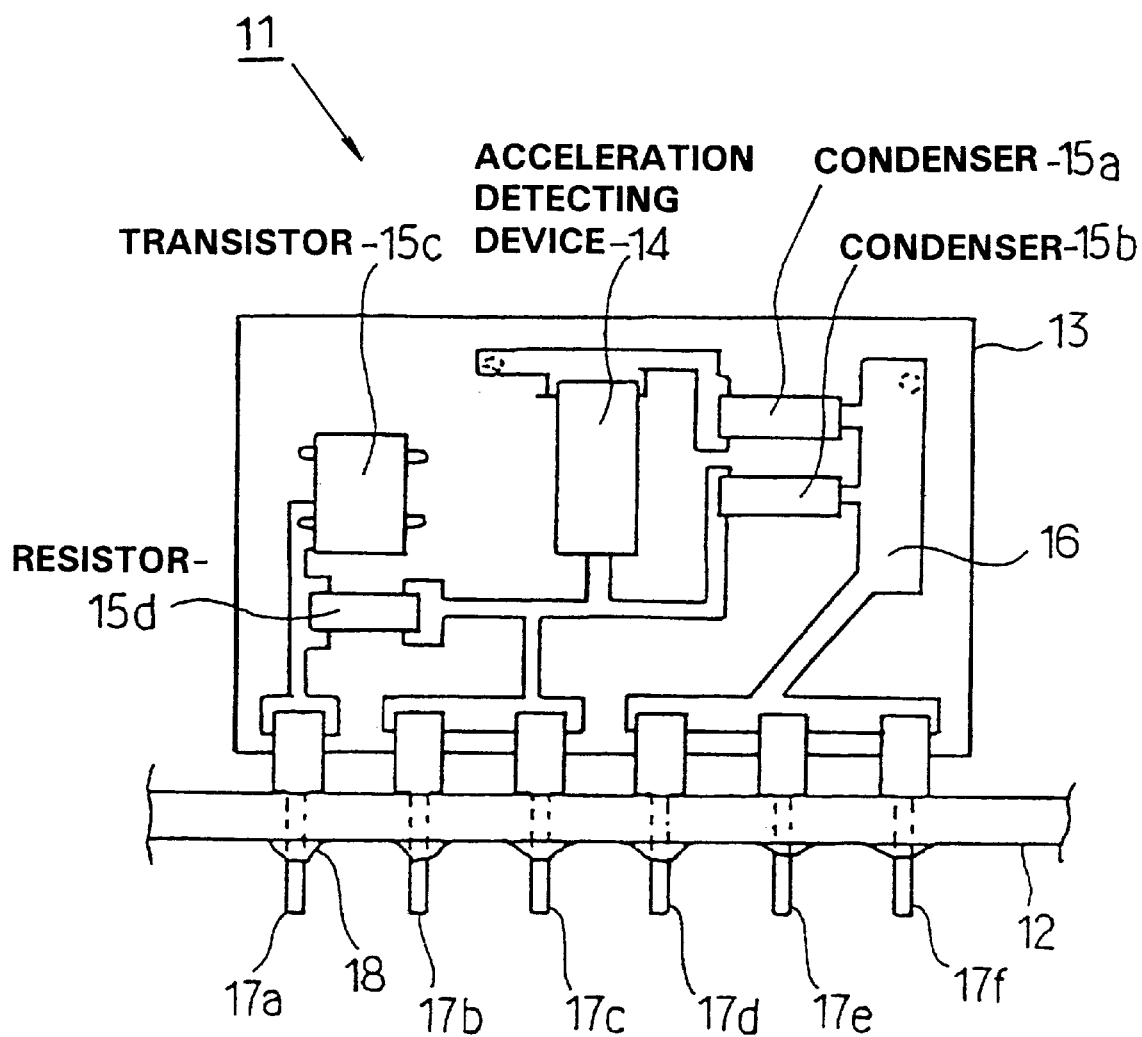
FIG. 8 is a front view of an acceleration sensor devised by the present inventor, though it is not known.

When the coordinates in the foregoing acceleration sensor 11 shown in FIG. 8 are defined in the same manner as above, if yawing in the Y-axis direction occurs, the noise component Dy given by h×sin θ arises as a matter of course, and is superimposed on sensitivity acting in the Y-axis direction, whereby detection precision is lowered.

As mentioned above, since the detecting direction of the acceleration detecting device 24 in the acceleration sensor 21 of this embodiment is the X-axis direction, the acting acceleration can be detected with high precision even if the mount space is reduced by mounting the circuit substrate 23 perpendicularly to the mounting substrate 22.

The specific structure of the acceleration detecting device 24 may be the same as that of a well-known appropriate acceleration detecting device as long as the acceleration detecting direction is set parallel to the main surface of the circuit substrate 23 when the acceleration detecting device 24 is mounted on the circuit substrate 23.

Figure 5:
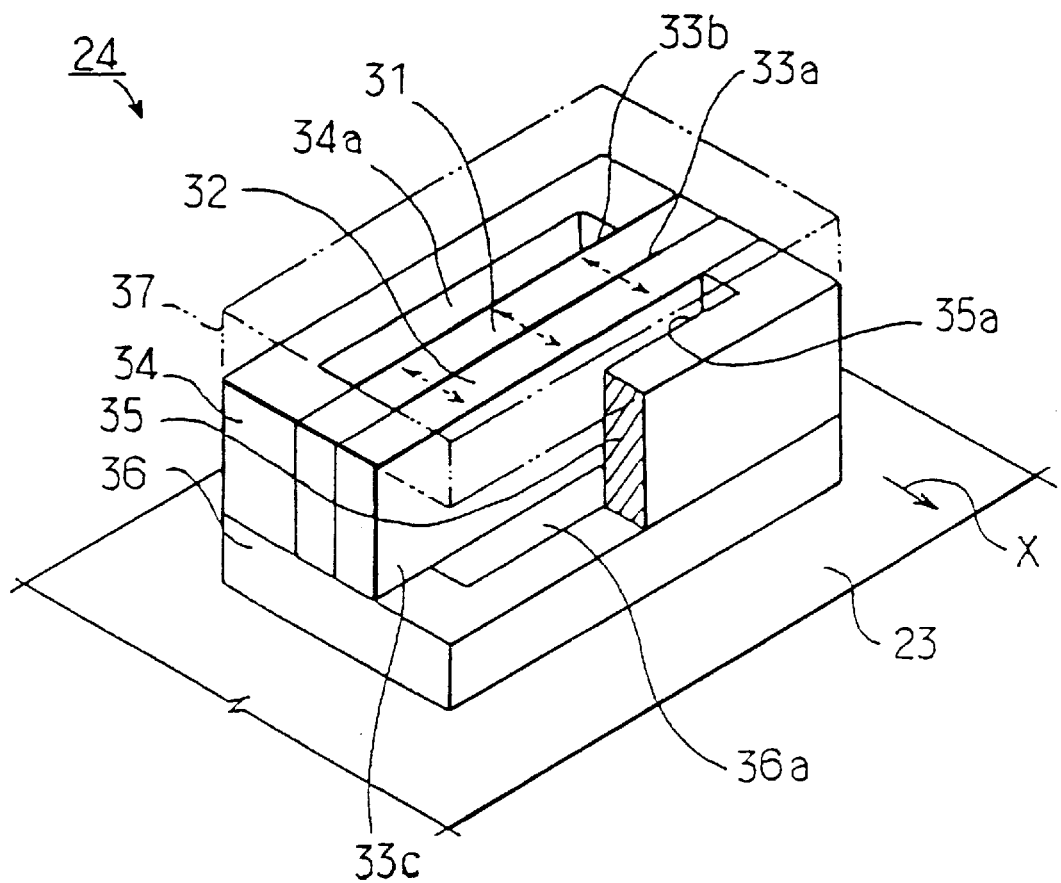
FIG. 5 is a perspective view of an acceleration detecting device to be used in the embodiment of the present invention.
Figure 6:
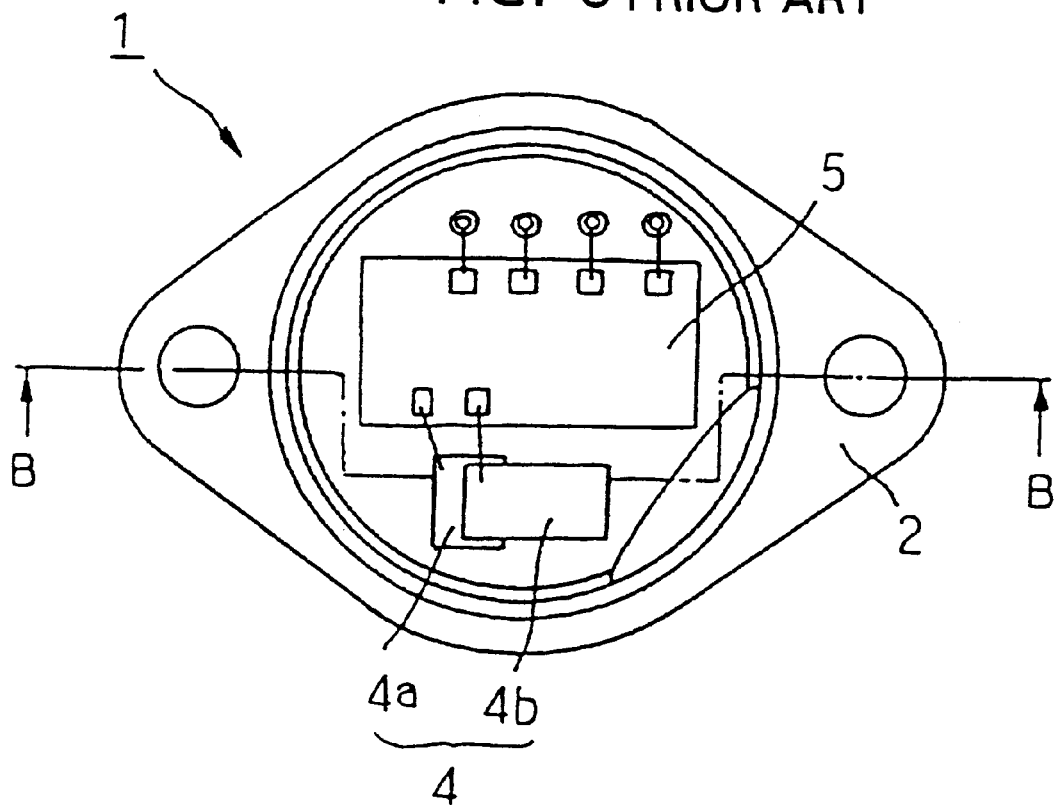
FIG. 6 is a plan view of a conventional acceleration sensor.

FIG. 5 shows a typical structure of the acceleration detecting device 24. In the acceleration detecting device 24 shown in FIG. 5, first and second piezoelectric ceramic plates 31 and 32, which are polarized in the direction shown by the broken arrow, are laminated through an intermediate electrode 33a. Electrodes 33b and 33c are formed on the outer surfaces of the first and second piezoelectric ceramic plates 31 and 32, respectively.

The first and second piezoelectric ceramic plates 31 and 32 are supported by support members 34 and 35 respectively having cutouts 34a and 35a. The support members 34 and 35 having such cutouts 34a and 35a support the laminated first and second piezoelectric ceramic plates 34 and 35 near both ends thereof. Furthermore, a case substrate 36 having a recess 36a inside thereof, and a case substrate 37 (which is schematically shown by a two-dot chained line) are respectively laminated on and under the first and second piezoelectric ceramic plates 31 and 32 and the support members 34 and 35.

In the above acceleration detecting device 24, the case substrate 37 may be mounted on, for example, the circuit substrate 23 shown in FIG. 1 as it points in the direction shown in FIG. 5. The acceleration detecting direction in this case corresponds to the direction of thickness of the first and second piezoelectric ceramic plates 31 and 32, that is, the direction shown by the arrow X in FIG. 5.

Figure 7:
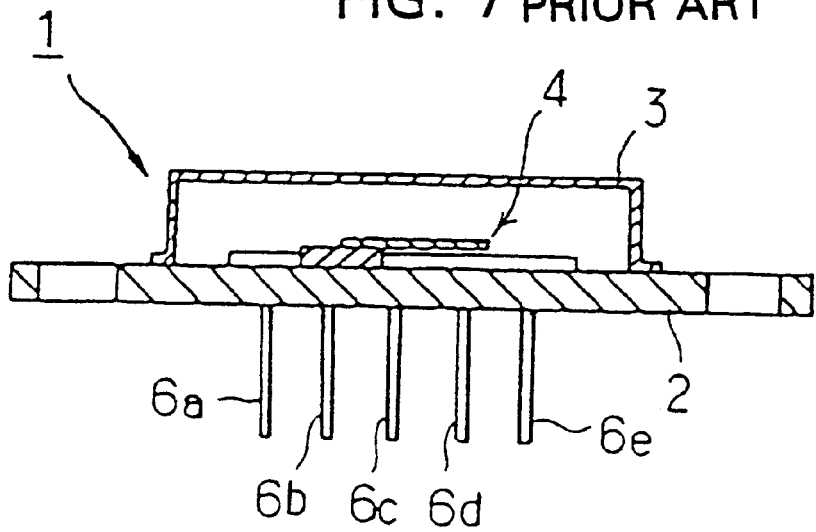
FIG. 7 is a sectional view taken along the line B—B shown in FIG. 6 for explaining the conventional acceleration sensor.

Though the detecting portion for detecting the acting acceleration is supported at both ends in the acceleration detecting device 24 shown in FIG. 5, it may be supported in the same cantilever manner as in the acceleration detecting device 4 shown in FIG. 7.

Furthermore, piezoelectric materials other than piezoelectric ceramics, for example, liquid crystal, may be employed in the acceleration detecting device 24.

As described above, in the acceleration sensor according to the present invention, a circuit substrate with an acceleration detecting device mounted thereon is mounted perpendicularly to a mounting substrate, and the detecting direction of the acceleration detecting device is parallel to both the mounting substrate and the circuit substrate. Since the circuit substrate is mounted in the perpendicular direction to the mounting substrate, the space for the acceleration sensor can be effectively reduced. In addition, though the circuit substrate is prone to yaw in the thickness direction thereof because of its mounting structure, detection precision is prevented from being lowered by yawing since the acceleration detecting direction is parallel to the main surfaces of the circuit substrate and the mounting substrate.

Accordingly, the acceleration sensor of the present invention achieves downsizing of the acceleration detecting portion without lowering detection precision.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An acceleration sensor for sensing acceleration in a predetermined acceleration detecting direction, comprising:

a first substrate having a surface parallel to the acceleration detection direction;

an acceleration detecting device mounted on said surface of said first substrate; and a second substrate, said first substrate being mounted on a surface of said second substrate such that said surface of said first substrate is perpendicular to said surface of said second substrate and parallel to the acceleration detecting direction.

2. The acceleration sensor of claim 1, wherein said first substrate is a circuit substrate and said second substrate is a mounting substrate.

3. The acceleration detecting device according to claim 1, wherein said acceleration detecting device includes piezoelectric elements polarized in the acceleration detecting direction.

4. An acceleration sensor comprising:

an acceleration detecting device;

a circuit substrate having said acceleration detecting device mounted thereon and a signal processing circuit electrically connected to said acceleration detecting device to subject output of said acceleration detecting device to signal processing; and a mounting substrate having said circuit substrate mounted thereon, wherein said circuit substrate is mounted so that a surface thereof is perpendicular to a surface of said mounting substrate and the acceleration detecting direction of said acceleration detecting device is parallel to both said surface of said circuit substrate and said surface of said mounting substrate.

5. The acceleration sensor of claim 4, wherein said acceleration detecting device is a piezoelectric acceleration detecting device.

6. The acceleration detecting device according to claim 5, wherein said piezoelectric acceleration detecting device includes piezoelectric elements polarized in the acceleration detecting direction.

* * * * *